United States Patent
Tran

(10) Patent No.: US 12,159,494 B2
(45) Date of Patent: Dec. 3, 2024

(54) INTERACTIVE AUTOMOTIVE DIAGNOSTIC CONNECTOR WITH INTEGRATED USER COMMUNICATION CAPABILITIES

(71) Applicant: Innova Electronics Corporation, Irvine, CA (US)

(72) Inventor: Jonathan Tran, Irvine, CA (US)

(73) Assignee: Innova Electronics Corporation, Irvine, CA (US)

( * ) Notice: Subject to any disclaimer, the term of this patent is extended or adjusted under 35 U.S.C. 154(b) by 323 days.

(21) Appl. No.: 17/202,650

(22) Filed: Mar. 16, 2021

(65) Prior Publication Data
US 2022/0301365 A1  Sep. 22, 2022

(51) Int. Cl.
| | | |
|---|---|---|
| G07C 5/08 | (2006.01) | |
| G06F 3/16 | (2006.01) | |
| G07C 5/00 | (2006.01) | |

(52) U.S. Cl.
CPC ........... *G07C 5/0808* (2013.01); *G06F 3/167* (2013.01); *G07C 5/008* (2013.01); *G07C 2205/02* (2013.01)

(58) Field of Classification Search
CPC .. G07C 5/0808; G07C 5/008; G07C 2205/02; G06F 3/167
See application file for complete search history.

(56) References Cited

U.S. PATENT DOCUMENTS

| | | | |
|---|---|---|---|
| 7,620,484 B1* | 11/2009 | Chen | G07C 5/0808 701/31.5 |
| 9,754,473 B1* | 9/2017 | Chen | G08B 21/18 |
| 2005/0182537 A1* | 8/2005 | Tefft | G07F 17/0014 701/29.6 |
| 2007/0083306 A1* | 4/2007 | Comeau | G07C 5/008 701/29.6 |
| 2009/0276115 A1* | 11/2009 | Chen | G07C 5/0808 701/29.6 |
| 2015/0081163 A1 | 3/2015 | Molenkamp et al. | |
| 2016/0189447 A1* | 6/2016 | Valenzuela | G06F 11/3058 701/32.4 |
| 2016/0275729 A1* | 9/2016 | Jaipaul | B66F 3/24 |
| 2017/0092020 A1* | 3/2017 | Hathaway | G07C 5/0808 |
| 2021/0241548 A1* | 8/2021 | Maurer | G07C 5/008 |

* cited by examiner

*Primary Examiner* — Anne Marie Antonucci
*Assistant Examiner* — Patrick Daniel Mohl
(74) *Attorney, Agent, or Firm* — Stetina Brunda Garred & Brucker

(57) ABSTRACT

A handheld, interactive connector for an automotive diagnostic device configured for engagement with a diagnostic port on a includes a housing and a connector port coupled to the housing. The connector port is configured to be plug connectable to the diagnostic port to establish a communication pathway between the connector and the vehicle. The connector further includes a control unit configured to receive a user initiation signal from a user sensing device and generate a speaker command signal in response to receiving the user initiation signal. A speaker is coupled to the housing and is in operative communication with the control unit to receive the speaker command signal therefrom. The speaker is configured to emit an audible signal corresponding to the speaker command signal.

34 Claims, 4 Drawing Sheets

INTERACTIVE AUTOMOTIVE DIAGNOSTIC CONNECTOR WITH INTEGRATED USER COMMUNICATION CAPABILITIES

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to cable head for an automotive diagnostic kiosk, and more specifically, to an interactive cable head having integrated communication capabilities to facilitate use of the cable head by a user.

2. Description of the Related Art

Automotive diagnostic tools are commonly used to identify and diagnose problems on a vehicle. Many diagnostic tools are configured to plug into a diagnostic port on a vehicle, which may be located below the steering wheel on the vehicle. Once the diagnostic tool is connected, the tool may retrieve data and information from the vehicle for use in identifying a problem and a possible fix for the vehicle.

While many existing diagnostic tools may not require much user interaction beyond simply plugging the tool into the diagnostic port on the vehicle, many vehicle owners are not familiar with the diagnostic port, and thus, may struggle to find the port and connect the tool to the port.

In the case of conventional diagnostic tools that may be packaged and sold as individual units to individual owners, the inability to find the diagnostic port may be mitigated by including an instruction manual which describes and illustrates the location of the diagnostic port. Thus, after purchasing the tool, a user may reference the manual before or during the initial use of the tool to guide the user through the process.

Although the instruction manual may provide guidance to the user for using the tool, there may be difficulties associated with referencing the manual during use of the tool. In particular, the position of the user when using the tool may make it inconvenient to simultaneously guide the tool into proper engagement with the diagnostic port and read the reference manual. In most vehicles, the diagnostic port is located beneath the steering wheel, and thus, the diagnostic port tends to be in a dark, confined space. A user, unfamiliar with the specific location of the diagnostic port, may position his head in the dark, confined space to locate the diagnostic port. At the same time, the user's hands may be grasping the tool and/or feeling for the diagnostic port. When the user is in such a position, it may be difficult, if not impossible, to read an instruction manual, or turn the page on an instruction manual. Thus, the user may be resigned to going back-and-forth, between looking and feeling for the diagnostic port, and reading the instruction guide, until the tool is properly aligned with and then engaged with the diagnostic port. This process may be cumbersome, and may ultimately lead to the user giving up before successfully using the tool.

Additional limitations associated with the reliance on an instruction manual for guidance in using the tool is that access to an instruction manual may be difficult for tools that are intended for use by multiple individuals. For instance, diagnostic kiosks may be located in a publicly accessible location (e.g., a parts store or gas station) and may interact with several vehicle owners to service several vehicles over the course of a given day, and thus, any diagnostic hardware associated therewith may not include an instruction manual similar to that packaged with a unit intended for use by a single owner. Therefore, the average vehicle owner, who may not have a comfort level with automotive diagnostics, may be intimidated by the kiosk, and may forego use of the kiosk.

Accordingly, there is a need in the art for an interactive diagnostic device capable of facilitating connection with a diagnostic port and the associated diagnosis of the vehicle. Various aspects of the present disclosure address this particular need, as will be discussed in more detail below.

BRIEF SUMMARY

Various aspects of the present disclosure are directed toward an interactive connector for a diagnostic device. The interactive connector may include a speaker and/or a microphone, to allow for verbal interaction with a user to guide the user during use of the diagnostic device. Therefore, a user who may lack a comfort level or familiarity with automotive diagnostics may be provided with step-by-step guidance and explanation during use of the diagnostic device.

According to one implementation, there is provided an interactive communication system for use with an automotive diagnostic device for performing diagnostics on a vehicle. The communication system includes a hand-holdable housing, and a connector port coupled to the housing and configured to be plug connectable to the diagnostic port to establish a communication pathway with the vehicle. The system further includes a speaker coupled to the housing and operative to facilitate audio communication with a user. A user sensing device is in operative communication with the speaker and is configured to initiate audio communication with the user, via the speaker, in response to the user sensing device detecting a user entering an area proximate the diagnostic device.

In accordance with another embodiment of the present disclosure, there is provided a handheld, interactive connector for an automotive diagnostic device configured for engagement with a diagnostic port on a vehicle for communicating with an onboard vehicle computer. The connector includes a housing and a connector port coupled to the housing. The connector port is configured to be plug connectable to the diagnostic port to establish a communication pathway between the connector and the vehicle. A speaker is coupled to the housing and operative to emit audio communications associated with use of the connector by a user.

The connector may additionally include a control unit configured to receive a user initiation signal from a user sensing device and generate a speaker command signal in response to receiving the user initiation signal.

The user sensing device may include a microphone connected to the housing, and the user initiation signal may include a verbal command received at the microphone. The user sensing device may include a proximity sensor capable of generating the speaker command signal when a user is within a predetermined range of the proximity sensor.

The connector may additionally include a light connected to the housing and configured to illuminate an area adjacent the housing. The connector port may define an engagement axis along which the connector port is connectable to the diagnostic port, with the light being configured to emit light in a direction parallel to the engagement axis.

The control unit may include a memory circuit having the speaker command signal stored thereon.

The control unit may be at least partially disposed within the housing or the control unit may be disposed outside of the housing. The control unit may be in operative communication with the connector port to receive vehicle signals from the vehicle. The control unit may be configured to generate a speaker status signal based on the received vehicle signals. The speaker status signal may be representative of a passed, failed, or inconclusive status of the vehicle as determined based on an analysis of the vehicle signals received from the vehicle. The speaker status signal may be representative of a sequence of communicating with the vehicle.

The control unit may be configured to generate a completion signal based on the sequence of communicating with the vehicle having reached a predetermined milestone.

According to another embodiment, there is provided a method of communicating with an onboard vehicle computer through a diagnostic port on the vehicle. The method includes receiving a user initiation signal from a user sensing device, with the user initiation signal being received at a control unit of a handheld connector for an automotive diagnostic device. The handheld connector includes a housing, a speaker, and a connector port coupled to the housing and configured to be plug connectable to the diagnostic port to establish a communication pathway between the connector and the vehicle. The method additionally includes emitting an audible signal from the speaker in response to receiving the user initiation signal. The audible signal may correspond to the speaker command signal, and may include instructions for connecting the connector port of the handheld connector to the diagnostic port on the vehicle.

The step of receiving the user initiation signal may include receiving a proximity signal from a proximity sensor, with the proximity signal being representative of a location of a user adjacent the automotive diagnostic device.

The method may also include the step of illuminating a light adjacent the connector port after receiving the user initiation signal.

The method may comprise emitting an audible status signal from the speaker representative of a status of signal transmission between the handheld connector and the vehicle.

The method may additionally include detecting a sound signal at a microphone on the handheld connector and implementing an associated function in response to detection of the sound signal. The associated function may include the step of emitting the audible signal including instructions for connecting the connector port of the handheld connector to the diagnostic port on the vehicle.

The method may further include emitting an audible signal including instructions for disconnecting the connector port of the handheld comment to the diagnostic port on the vehicle.

According to a further embodiment, there is provided a diagnostic kiosk configured for use with a diagnostic port on a vehicle for communicating with an onboard vehicle computer. The kiosk includes a main unit housing, and a cable connected to the main unit housing. A cable head is connected to the cable and includes a connector port configured to be plug connectable to the diagnostic port to establish a communication pathway between the connector and the vehicle. The cable head additionally includes a control unit configured to receive a user initiation signal from a user sensing device, and generate a speaker command signal in response to receiving the user initiation signal. The cable head further comprises a speaker coupled to the housing and in operative communication with the control unit to receive the speaker command signal therefrom, the speaker being configured to emit an audible signal corresponding to the speaker command signal.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of an interactive cable head for an automotive diagnostic kiosk is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Figure 1:
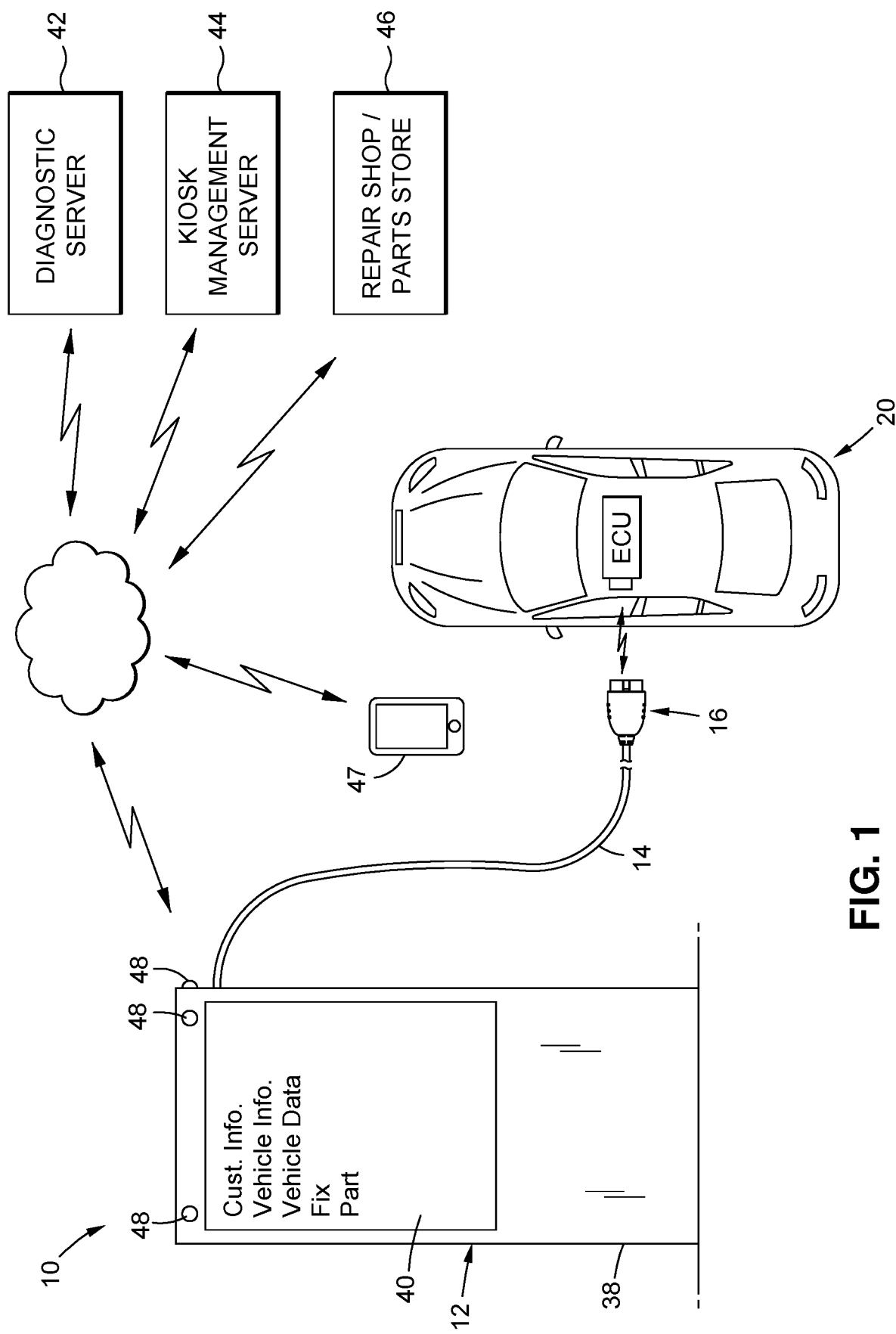
FIG. 1 is a schematic drawing of an automotive diagnostic system including a diagnostic kiosk having an interactive cable head configured to be plug connectable into a diagnostic port on a vehicle.
Figure 2:
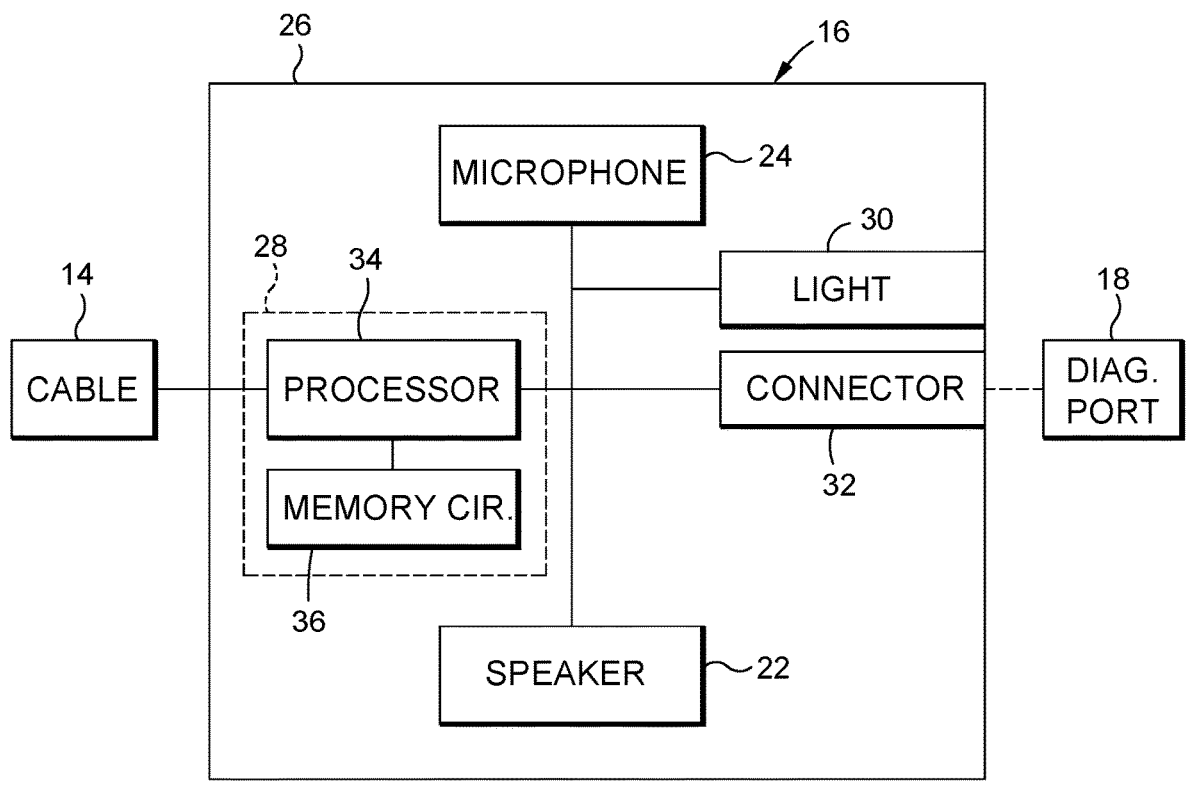
FIG. 2 is a schematic diagram of the interactive cable head.
Figure 3:
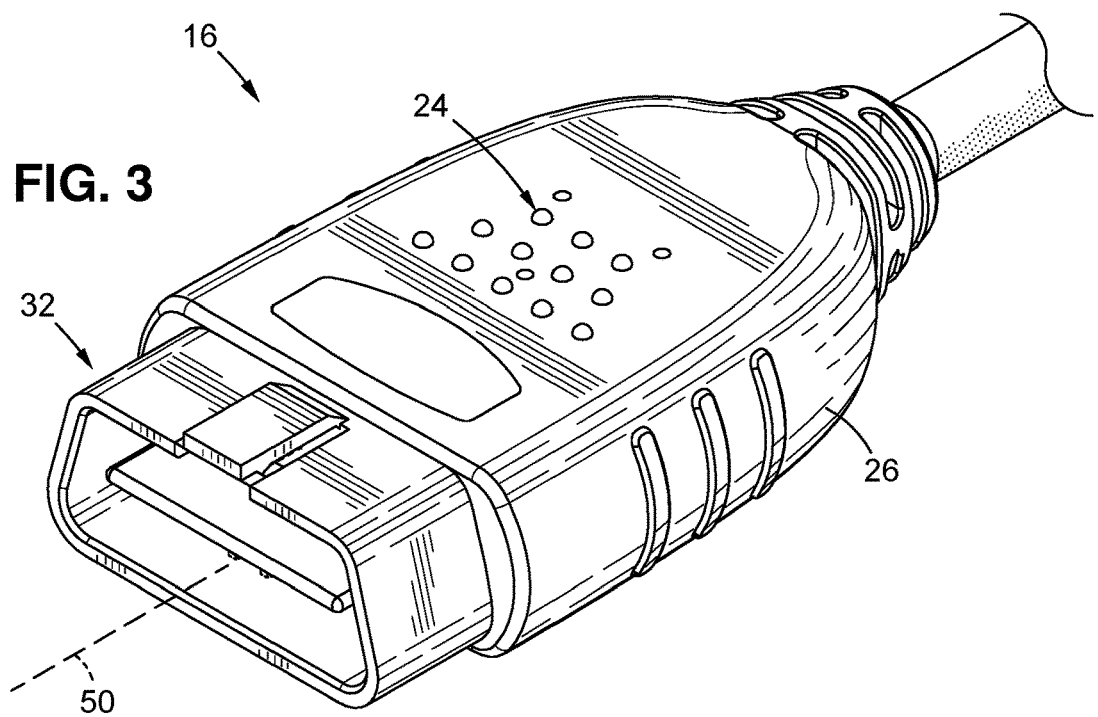
FIG. 3 is an upper perspective view of the interactive cable head.
Figure 4:
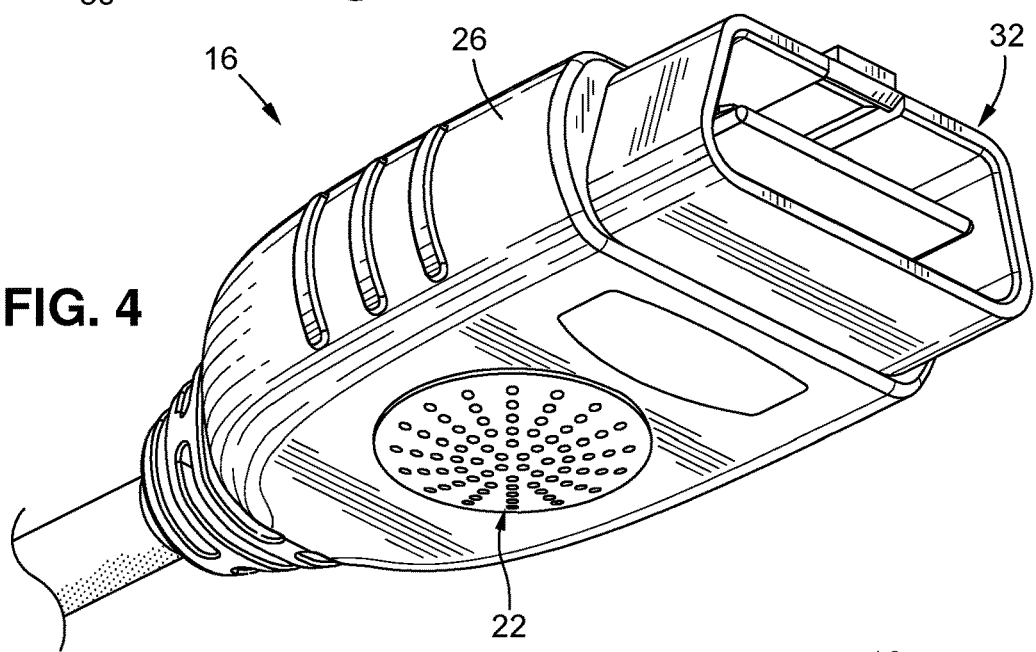
FIG. 4 is a lower perspective view of the interactive cable head.
Figure 5:
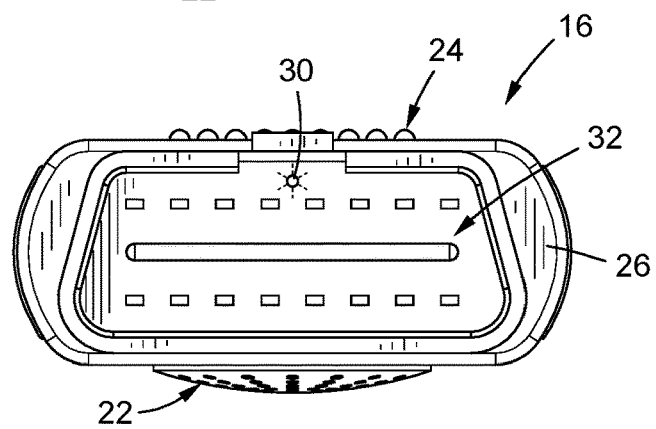
FIG. 5 is an end view of the interactive cable head.
Figure 6:
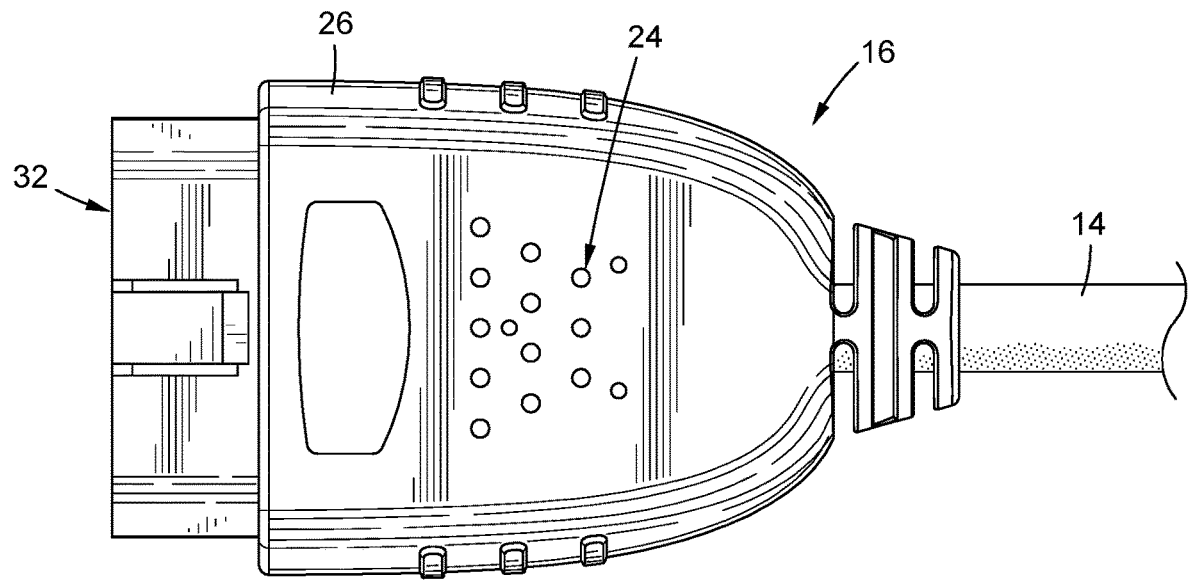
FIG. 6 is a top view of the interactive cable head.
Figure 8:
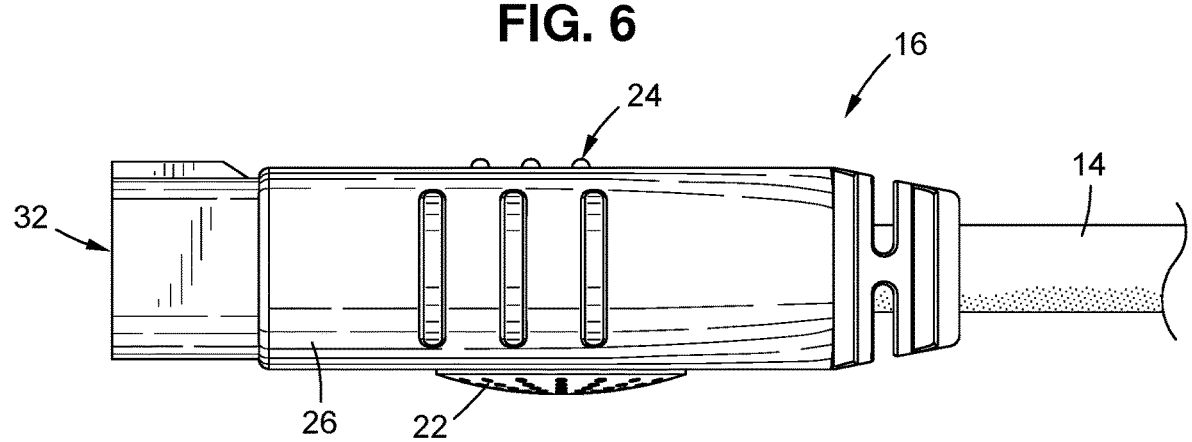
FIG. 8 is a side view of the interactive cable head.
Figure 7:
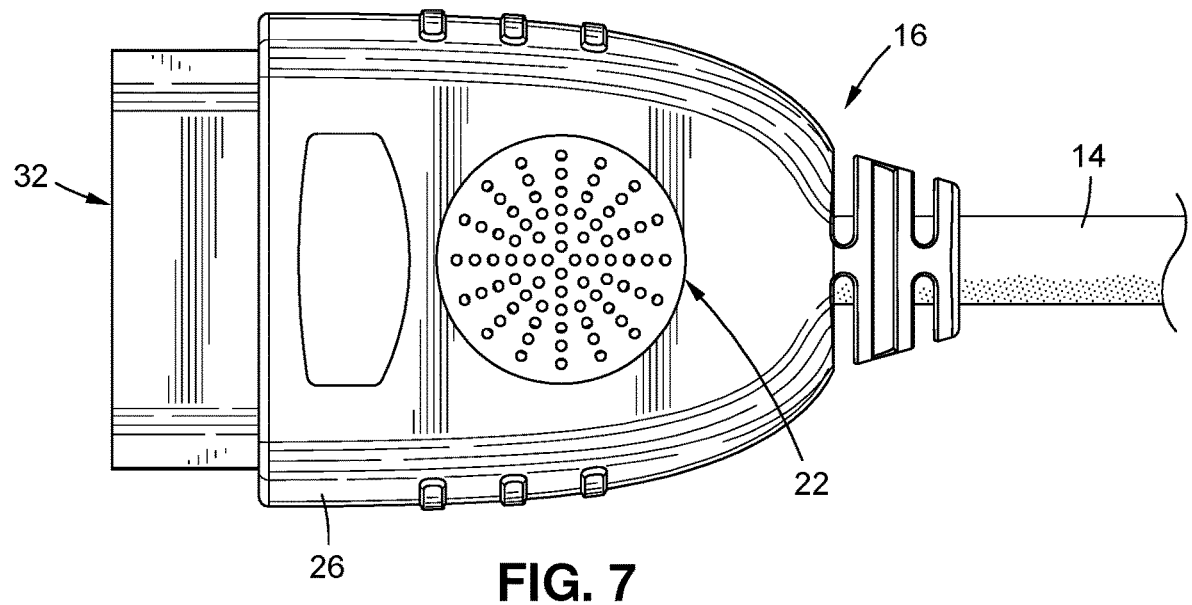
FIG. 7 is a bottom view of the interactive cable head.

Referring now to FIG. 1, there is depicted an diagnostic system including an automotive diagnostic kiosk 10 having a main unit 12, a cable 14, and a handheld, interactive cable head 16 configured to be plug connectable into a diagnostic port 18 on a vehicle 20 to facilitate retrieval of diagnostic data and vehicle information from the vehicle 20. The cable head 16 (e.g., connector) may include a speaker 22 and/or microphone 24 incorporated therein to facilitate the transmission and/or receipt of audible assistance, alerts, instructions, etc., to/from the user during operation of the cable head 16. In this regard, the interactive nature of the cable head 16 may guide novice users through the process of connecting the cable head 16 to the vehicle 20, retrieving diagnostic data from the vehicle 20, selecting a diagnostic service, or any related e-commerce options that may be available. The ability of the cable head 16 to provide audible instructions, commands, updates, etc., to the user during use of the cable head 16 may provide an easier to use alternative to a conventional instructional manual. In this regard, the user may remain visually focused on the position of the cable head 16 and the diagnostic port on the vehicle, rather than having to periodically look at an instruction guide. Additionally, the user's hands may no longer need to hold an instruction manual, and instead, may remain free to hold the cable head 16 with one hand and feel for the diagnostic port with the other hand. Therefore, the interactive nature of the cable head 16 makes it much easier for the user to navigate through the process of proceeding through the diagnostic process.

The cable head 16 includes a housing 26 attached to the end of the cable 14. The cable head 16 may additionally include a control unit 28, the microphone 24, the speaker 22, a light 30, and an OBD-II connector port 32 coupled to the housing 26. The control unit 28 may include processor 34 and a memory circuit 36 in communication with the processor 34. The processor 34 may also be in operative communication with the microphone 24, speaker 22, light 30, and OBD-II connector port 32 to facilitate the functionality of the cable head 16 described in more detail below. The processor 34 may receive power signals, data signals, etc., process data and/or power signals, and communicate power and/or data signals to other components on the cable head 16. The memory circuit 36 may be used to store a library of preprogrammed commands, as well as temporary storage of data and information retrieved from the vehicle 20. Although the control unit 28 is shown as being located within the cable head housing 26, it is contemplated that the control unit 28, either entirely or partially, may be located external to the cable head housing 26. For instance, the processor 34 and/or the memory circuit 36 may be located in the main unit 12 of the kiosk 10 and communicate to the various components on the cable head 16 via the cable 14. In this regard, those skilled in the art will appreciate that the cable head 16 and cable 14 may collectively function as an interactive communication interface for use between an automotive diagnostic device (e.g., the main unit 12 of the kiosk 10) and the vehicle.

The microphone 24 may be in operative communication with the processor 34 and connected to the housing 26 in a manner which allows the microphone 24 to pick up or detect sound signals from a user or the ambient environment, e.g., sounds from the vehicle 20 under test. In this regard, a portion of the microphone 24 may be on or near an outer surface of the housing 26, or alternatively, the housing 26 may include one or more openings formed therein and aligned with the microphone 24 to mitigate obstruction of the sound signal prior to being sensed by the microphone 24. The user may interface with a virtual assistant or live assistant to request support or provide verbal triggers or status updates to the diagnostic system through the microphone 24. It is also contemplated that the microphone 24 may be able to detect sounds generated by the vehicle 20, such as the engine being on or off, or other symptomatic sounds (e.g., clicks, squeals, grinding, etc.) generated by the vehicle 20. In some embodiments, the microphone 24 may have sufficient sensitivity to detect vibrations of the vehicle 20 when the cable head 16 is connected to the diagnostic port 18 on the vehicle 20. The ability to detect vibrations may allow for determination of operational status of the vehicle 20, as well as help in diagnosing the vehicle 20. For instance, when the vehicle 20 is turned on, the microphone 24 may be able to detect vibrations caused by operation of the engine. Furthermore, if the engine is revved, the microphone 24 may be able to detect an increase or decrease in engine RPM, which may be useful when completing a diagnostic overview of the vehicle 20.

The speaker 22 may be in operative communication with the processor 34 and connected to the housing 26 in a manner which allows the speaker 22 to emit an audible signal, which may be heard by a user. Accordingly, a portion of the speaker 22 may be on or near an outer surface of the housing 26, or alternatively, the housing 26 may include one or more openings formed therein and aligned with the speaker 22 to mitigate obstruction of sound emitted by the speaker 22.

The light 30 may be in operative communication with the processor 34 and connected to the housing 26 in a position which allows the light 30 to illuminate the diagnostic port 18 on the vehicle 20 during use of the cable head 16 to facilitate connection of the cable head 16 to the diagnostic port 18. The light 30 may include one or more light emitting diodes (LEDs) or other light devices known in the art.

The connector port 32 may be in operative communication with the processor 34 and connected to the housing 26 in a manner which allows for pluggable connection between the connector port 32 and the diagnostic port 18 on the vehicle 20. The connector port 32 may be an OBD-II connector or other connectors currently known or later developed, that facilitate operative connection with the vehicle 20 and retrieval of data and/or information from the vehicle 20.

The cable head 16 is operatively connected to a main unit 12 of the kiosk 10 via a cable 14, which allows for the transmission of signals between the main unit 12 and the cable head 16. According to one embodiment, the main unit 12 includes a kiosk housing 38 and a display 40 connected to the kiosk housing 38. The display 40 may be a touch screen display, and may be used to display customer information, vehicle information, vehicle data, possible fixes, as well related repair parts, repair tools, parts and repair shops, etc.

The main unit 12 may include a transceiver to facilitate communications between the main unit 12 and one or more remote locations, such as a diagnostic server 42, a kiosk management server 44, a repair shop/parts store 46, and a user's smartphone 47. For instance, data and information retrieved from the vehicle 20 by the cable head 16 may be uploaded to the diagnostic server 42 via the transceiver for further analysis to determine a most likely fix. For a more detailed discussion regarding analysis of data and information to determine a most likely fix, please refer to U.S. Pat. No. 6,807,469, entitled AUTO DIAGNOSTIC METHOD AND DEVICE, U.S. Pat. No. 6,925,368, entitled AUTO DIAGNOSTIC METHOD AND DEVICE, U.S. Pat. No. 7,620,484, entitled AUTOMOTIVE MOBILE DIAGNOSTICS, U.S. Pat. No. 8,019,503, entitled AUTOMOTIVE DIAGNOSTIC AND REMEDIAL PROCESS, U.S. Pat. No. 8,370,018, entitled AUTOMOTIVE DIAGNOSTIC PROCESS, U.S. Pat. No. 8,909,416, entitled HANDHELD SCAN TOOL WITH FIELD SOLUTION CAPABILITY, U.S. Pat. No. 9,026,400, entitled DIAGNOSTIC PROCESS FOR HOME ELECTRONIC DEVICES, U.S. Pat. No. 9,177,428, entitled PREDICTIVE DIAGNOSTIC METHOD, U.S. Pat. No. 9,646,432, entitled HAND HELD DATA RETRIEVAL DEVICE WITH FIXED SOLUTION CAPABILITY, U.S. Pat. No. 10,643,403, entitled PREDIC- TIVE DIAGNOSTIC METHOD AND SYSTEM, U.S. Patent Application Pub. No. 2013/0297143, entitled METHOD OF PROCESSING VEHICLE DIAGNOSTIC DATA, U.S. Patent Application Pub. No. 2019/0304208, entitled SYSTEM AND METHOD FOR PROACTIVE VEHICLE DIAGNOSIS AND OPERATIONAL ALERT, and U.S. Patent Application Pub. No. 2019/0304213, entitled SYSTEM AND METHOD FOR PROACTIVE VEHICLE DIAGNOSIS AND OPERATIONAL ALERT, the entire contents of each of which is expressly incorporated herein by reference.

The diagnostic kiosk 10 may additionally include one or more proximity sensors 48 in operative communication with the cable head 16 to facilitate implementation of certain cable head functionality based on detected proximity of the user. In this regard, the proximity sensor 48 may be capable of detecting the position of the user and/or the vehicle 20, and when the user/vehicle 20 is detected to be within a predetermined range, various functionalities may be initiated or ceased. For instance, when a user is detected within a predetermined range (e.g., anywhere between 0-20 feet), a preprogrammed recording may be emitted from the speaker 22 to guide the user through the initial steps of the process. As another example, the proximity sensor 48 may detect placement of the cable head 16 near the diagnostic port 18, which may cause the light 30 to turn on.

The proximity sensor 48 may be located on the main unit 12 and/or the cable head 16. For certain functionalities, e.g., triggering of the light 30, the proximity sensor 48 may require location in the cable head 16.

In one embodiment, the proximity sensor 48 includes the microphone 24 and uses detected sounds, such as the user's voice, or the sound of a vehicle 20 approaching the kiosk 10, to determine proximity. In another embodiment, the proximity sensor 48 may include a sensor which emits an electromagnetic field or a beam of electromagnetic radiation (e.g., infrared) and detects changes in the field or a return signal to determine proximity of an object. The proximity sensors 48 may be similar to the sensors commonly used on a vehicle 20 to detect nearby vehicles.

An exemplary use of the cable head 16 may begin with a user driving his vehicle 20 into a parking spot or parking bay adjacent the kiosk 10. The kiosk 10 may be located at a gas station, automotive parts/repair shop, shopping center parking lot, etc. As the vehicle 20 approaches, a proximity sensor 48 may detect the vehicle 20 now being in proximity of the kiosk 10.

After parking the vehicle 20, the driver may exit the vehicle 20 and approach the kiosk 10. As the driver approaches the vehicle 20, the proximity sensor 48 may detect the driver being in proximity to the kiosk 10, such as by detecting the physical presence of the driver or sounds generated by the driver (e.g., walking and/or talking), and may trigger a speaker command signal to initiate the playing of a prerecorded greeting through the speaker 22 on the cable head 16. The greeting may direct the user to the screen on the kiosk 10, where the user may be presented with additional information and asked to provide information to set up a customer profile or log into a customer profile if one has already been established. The user may also select a diagnostic service to be completed by the kiosk 10. It is contemplated that various levels of diagnostic services may be available, ranging from a basic level which may provide an indication of diagnostic trouble codes (DTCs) being detected on the vehicle 20, without providing any further diagnostic, to a more comprehensive level, which may analyze any detected DTCs and provide an indication of a most likely fix, as well as providing predictive diagnostics for diagnostic issues that may arise in the future based on the mileage and condition of the vehicle 20.

The user will then grab the cable head 16 and plug the cable head 16 into the diagnostic port 18 on the vehicle 20. The microphone 24 may be active to listen for any commands or questions from the user. For instance, the user may not be familiar with the location of the diagnostic port 18, and thus, the user may ask for additional assistance or clarification. In response to such a request, the speaker 22 may emit clarifying instructions or a recording of further details of the location of the diagnostic port 18. It is contemplated that the recording may be generic (e.g., applicable to several vehicles) or alternatively, the recording may be vehicle specific. In this regard, a library of vehicle specific instructions detailing the location of the diagnostic port 18 may be located in the memory circuit 36. If the library includes vehicle specific instructions applicable to the vehicle 20 under test, the vehicle specific instructions may be provided to the user. Otherwise, the generic instructions may be provided. It is also contemplated that the user may be connected to a virtual assistant or a live assistant/customer service representative to answer questions or provide guidance. At some facilities, there may be one or more automotive professionals on-site, and the user may request, via a verbal request (e.g., "please send a mechanic") detected by the microphone 24, for an automotive professional to physically assist in the process. In this respect, the verbal request detected by the microphone 24 may be converted to an electrical signal which is transmitted to an alert system at the facility to alert the mechanics of the needed help. For instance, the alert system may include a notification that appears on the mechanics smartphone, or a notification that may appear on a computer of a scheduling coordinator at the facility. The alert system may also include a speaker which may broadcast the requested assistance in a garage or other area where mechanics may be present.

As the cable head 16 is moved into proximity of the diagnostic port 18, the light 30 on the cable head 16 may be turned on/actuated to illuminate the diagnostic port 18. In many vehicles, the diagnostic port 18 is located under the steering wheel, and thus, the area may not be well lit. The light 30 may be positioned to emit light along a light axis 50 that extends in front of the connector port 32 and generally parallel to an axis of engagement (e.g., the axis along which the connector port 32 engages with the diagnostic port 18). It is also contemplated that when the cable head 16 is used during the night (e.g., during darkness), the light 30 may be turned on earlier (e.g., after customer log on or after a diagnostic selection is made) to provide light to the user when moving the cable head 16 from the main unit 12 to the diagnostic port 18 on the vehicle 20. In this regard, it is contemplated that turning the light 30 on and off may be performed autonomously in response to one or more triggering conditions, e.g., detected vehicle/user, ambient light conditions, etc. However, it is also contemplated that the cable head 16 may include a switch, button, or other manual actuator which would allow a user to turn the light 30 on or off.

When the connector port 32 is engaged with the diagnostic port 18, electronic signals may be communicated between the cable head 16 and the vehicle 20. The processor 34 may be capable of detecting successful connection between the cable head 16 and the vehicle 20, either through detected physical connection, or detection of signal transfer between the cable head 16 and the vehicle 20. When a successful connection is detected, the speaker 22 may emit an alert signal representative of a successful connection. A successful connection may also be used as a trigger to turn off the light 30.

As information is exchanged between the vehicle 20 and the cable head 16, the speaker 22 may provide audible status updates throughout the process. For instance, the speaker 22 may indicate the following milestones: 1) retrieval of electronic VIN, 2) retrieval of diagnostic data (e.g., DTCs, live data, sensor data, etc., upload of retrieved data/information to a diagnostic database for diagnostic analysis), 3) receipt of most likely fix from the diagnostic server 42; 4) retrieval of additional vehicle data to confirm most likely fix; and 5) completion with instructions to disconnect cable head 16 from the diagnostic port 18.

The speaker 22 may also provide instructions for returning the cable head 16 to a holster or other storage location on the main unit 12 when complete. When the process is complete the speaker 22 may also provide an audible summary of the diagnostic process. The diagnostic summary may include an indication as to the urgency of any detected diagnostic issues (e.g., very urgent or not urgent), as well as an identification of possible problems (e.g., faulty mass airflow sensor). For more information regarding determination of diagnostic urgency, please refer to U.S. Pat. No. 8,825,270, entitled METHOD AND APPARATUS FOR INDICATING AN AUTOMOTIVE DIAGNOSTIC URGENCY, and U.S. Pat. No. 9,761,062, entitled A METHOD AND APPARATUS FOR INDICATING AN AUTOMOTIVE DIAGNOSTIC URGENCY, the contents of both of which are expressly incorporated herein by reference. The diagnostic summary may also be representative of a passed, failed, or inconclusive status of the vehicle 20 as determined based on an analysis of the vehicle data received from the vehicle 20.

It is understood that upon learning of the diagnostic issue, the user may want to purchase associated repair parts, or schedule associated repair services. Thus, the user may be prompted, via the speaker 22, as to whether the user wants to search for the associated repair parts and/or services. The user may provide a verbal command, detectable by the microphone 24, indicative of either having interest in the parts/services, or not having interest in the parts/services. If the user does have interest, a search may be done to identify the parts/services and make any associated appointments.

The incorporation of the speaker 22 into the cable head 16 may allow the cable head 16 to serve as a concierge or virtual assistant, particularly with the regard to purchasing and scheduling repair parts and services. In particular, a virtual assistant may ask the user if the user is interested in locating nearby parts or services. If so, the virtual assistant may ask the user to define a radius (e.g., 5 miles, 10 miles, etc.) within which the virtual assistant can search for stores offering the parts or services. If multiple stores are identified within the preferred radius that offer the needed parts or services, the virtual assistant may ask the user if there is a preference to proceed with a particular store, or the virtual assistant may identify other factors that may be used to select one store from several different options. For instance, the virtual assistant may ask the user if selection of the store should be made based on the lowest cost of the parts/services, or if selection of the store should be made based on proximity. If the parts or services are identified, the virtual assistant may ask the user if the user wants to proceed with purchasing the parts or services. As an alternative, the virtual assistant may also ask the user if the user desires to have any parts that may be purchased to be delivered to a preferred address, rather than picking the parts up at a physical location. In this regard, the virtual assistant may additionally search online retailers that may offer the needed parts. Payment for the parts or services may be made with payment information that may have already been provided by the user or saved to the user's customer profile. Scheduling associated with the purchased parts or services may also be coordinated through the virtual assistant.

The functionalities of the virtual assistant may be facilitated by hardware and software located at a remote server in communication with the cable head 16.

The interactive nature of the cable head 16 may allow the user to inquire as to the possible uses of the data and information retrieved from the vehicle. In addition to the uses noted above (e.g., generation of a diagnostic summary, purchasing repair parts/services), it is possible that the retrieved data and information may be used when selling the vehicle. For instance, the retrieved data and information may provide an objective assessment as to the health of the vehicle, which may be included in the vehicle listing on an online marketplace. Any diagnostic summary, including needed repairs or predictive diagnostics, or other information derived from the retrieved data and information may be included in the vehicle listing or linked to the vehicle listing.

It is contemplated that the diagnostic system associated with the cable head 16 may also include a smartphone application ("app.") that may be downloaded onto a user's smartphone to access and retrieve information, data, reports, etc., from the diagnostic system, as well as upload information to the diagnostic system, such as customer information, billing information, etc. The interactive nature of the cable head 16 may provide assistance to the user when initially downloading and setting up the app. on the user's smartphone. For instance, the user may ask "how do I retrieve the app." and speaker 22 may provide instructions for accessing and downloading the app. It is also contemplated that the user may enter any information verbally via the microphone 24, such as the user's contact info, vehicle info, requested services, etc. That information may then be stored to the user's account, which may be set up via the kiosk, or via the app.

Although the foregoing describes the interactive cable head 16 as serving as the interface between the vehicle 20 and the main unit 12 of the kiosk 10, it is contemplated that the interactive functionalities described herein may be integrated into other automotive diagnostic devices without departing from the spirit and scope of the present disclosure. For instance, it is contemplated that a scan tool, code reader, dongle, or other diagnostic tools configured to be plug connectable to the diagnostic port on the vehicle, may be equipped with a speaker, microphone, and/or light, to facilitate connection with the diagnostic port on the vehicle, as well as subsequent use of the diagnostic device.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. An interactive communication interface for use between an automotive diagnostic device and a vehicle to guide a user in facilitating connection between the automotive diagnostic device and a vehicle electrical system for performing diagnostics on the vehicle, the communication interface comprising:
- a hand-holdable housing;
- a connector port coupled to the housing and configured to be plug connectable to the diagnostic port to facilitate communication of data signals with the vehicle;
- a speaker coupled to the housing and operative to facilitate transmission of audio signals to a user;
- a communication pathway coupled to the hand-holdable housing and connectable to the automotive diagnostic device, the communication pathway being configured to facilitate communication of both the data signals and the audio signals between the hand-holdable housing and the automotive diagnostic device, the audio signals including instructions associated with accessing and retrieving automotive diagnostic data and being transmissible along the communication pathway prior to any communication between the interactive communication interface and the diagnostic port; and
- a user sensing device in operative communication with the speaker and configured to initiate audio communication with the user, via the speaker, in response to the user sensing device detecting a user entering an area proximate the diagnostic device.

2. The interactive communication interface recited in claim 1, wherein the user sensing device includes a microphone connected to the housing, the microphone being configured to detect the user entering the area proximate the diagnostic device via a verbal command received at the microphone.

3. The interactive communication interface recited in claim 1, wherein the user sensing device includes a proximity sensor capable of detecting the user being within a predetermined range of the proximity sensor.

4. The interactive communication interface recited in claim 1, further comprising a light connected to the housing and configured to illuminate an area adjacent the housing.

5. The interactive communication interface recited in claim 4, wherein the connector port defines an engagement axis along which the connector port is connectable to the diagnostic port, the light being configured to emit light in a direction parallel to the engagement axis.

6. The interactive communication interface recited in claim 1, further comprising a memory circuit in communication with the speaker, the memory circuit having pre-recorded audio signals stored thereon.

7. The interactive communication interface recited in claim 1, wherein the user sensing device is coupled to the housing so as to be moveable with the housing.

8. The interactive communication interface recited in claim 1, wherein the user sensing device is disposed outside of the housing.

9. The interactive communication interface recited in claim 1, wherein the speaker is in operative communication with the connector port such that the speaker is configured to emit a speaker status signal based on a communication received from the vehicle.

10. The interactive communication interface recited in claim 9, wherein the speaker status signal is representative of a passed, failed, or inconclusive status of the vehicle as determined based on an analysis of the communication received from the vehicle.

11. The interactive communication interface recited in claim 9, wherein the speaker status signal is representative of a sequence of communications with the vehicle.

12. The interactive communication interface recited in claim 1, wherein communication pathway includes a cable.

13. The interactive communication interface recited in claim 1, further comprising a microphone coupled to the housing, wherein the communication pathway, the speaker, and the microphone are collectively configured to receive a verbal user request and communicate an audible response independent of a user navigating a digital screen.

14. The interactive communication interface recited in claim 1, wherein the audio signals include vehicle specific instructions.

15. The interactive communication interface recited in claim 1, wherein the audio signals include instructions for locating the diagnostic port on the vehicle.

16. The interactive communication interface recited in claim 1, wherein the audio instructions are configured to facilitate navigation through information on a digital screen associated with the automotive diagnostic device.

17. The interactive communication interface recited in claim 1, wherein the instructions associated with accessing and retrieving automotive diagnostic data are vehicle specific instructions.

18. The interactive communication interface recited in claim 1, wherein the instructions associated with accessing and retrieving automotive diagnostic data include information regarding a location of the diagnostic port on the vehicle.

19. A handheld, interactive interface for use between an automotive diagnostic device and a diagnostic port on a vehicle to guide a user in facilitating connection between the automotive diagnostic device and a vehicle electrical system, the interface comprising:
- a handheld housing;
- a connector port coupled to the housing and configured to be plug connectable to the diagnostic port on the vehicle to facilitate communication of data signals with the vehicle;
- a speaker coupled to the housing and operative to emit audio signals associated with use of the connector by a user; and
- a communication pathway coupled to the handheld housing and connectable to the automotive diagnostic device, the communication pathway being configured to facilitate communication of both the data signals and the audio signals between the hand-holdable housing and the automotive diagnostic device, the audio signals including instructions associated with accessing and retrieving automotive diagnostic data and being transmissible along the communication pathway prior to any communication between the interface and the diagnostic port.

20. The interface recited in claim 19, wherein the connector port includes an OBD-II connector port.

21. The interface recited in claim 19, wherein the speaker emits audio communications in response to the connector port being connected to the diagnostic port on the vehicle.

22. The interface recited in claim 19, wherein the connector port is configured to receive data from the vehicle and the speaker is configured to emit audio communications in response to receipt of data from the vehicle.

23. A method of providing audible assistance to a user to provide guidance in finding a diagnostic port on a vehicle and communicating with an onboard vehicle computer through the diagnostic port, the method comprising the steps of:
- receiving a user initiation signal from a user sensing device, the user initiation signal being received at a handheld interface configured for use between an automotive diagnostic device and the vehicle, the handheld interface including:
a housing,
a speaker being configured to transmit audio signals to a user,
a connector port coupled to the housing and configured to be plug connectable to the diagnostic port to facilitate communication of data signals with the vehicle; and
a communication pathway coupled to the housing and connectable to the automotive diagnostic device, the communication pathway being configured to facilitate communication of both the data signals and the audio signals between the housing and the automotive diagnostic device, the audio signals including instructions associated with accessing and retrieving automotive diagnostic data; and
transmitting the audio along the communication pathway prior to any communication between the handheld interface and the diagnostic port;
emitting an audible signal from the speaker in response to receiving the user initiation signal, the audible signal including instructions for connecting the connector port of the handheld connector to the diagnostic port on the vehicle.

24. The method recited in claim 23, wherein the step of receiving the user initiation signal includes receiving a proximity signal from a proximity sensor, the proximity signal being representative of a location of a user adjacent the automotive diagnostic device.

25. The method recited in claim 23, further comprising the step of illuminating a light adjacent the connector port after receiving the user initiation signal.

26. The method recited in claim 23, further comprising emitting an audible status signal from the speaker representative of a status of signal transmission between the handheld connector and the vehicle.

27. The method recited in claim 23, further comprising the step of detecting a sound signal at a microphone on the handheld connector and implementing an associated function in response to detection of the sound signal.

28. The method recited in claim 27, wherein the associated function is the step of emitting the audible signal including instructions for connecting the connector port of the handheld connector to the diagnostic port on the vehicle.

29. The method recited in claim 23, further comprising the step of emitting an audible signal including instructions for disconnecting the connector port of the handheld connector to the diagnostic port on the vehicle.

30. The method recited in claim 23, further comprising the step of sending a signal between the handheld interface and a diagnostic resource remote from the automotive diagnostic device.

31. The method recited in claim 30, wherein the step of sending the signal between the handheld interface and the diagnostic resource includes sending the signal from the handheld interface to the diagnostic resource remote from the automotive diagnostic device.

32. The method recited in claim 30, wherein the diagnostic resource is a smartphone.

33. The method recited in claim 30, wherein the diagnostic resource is a diagnostic server configured to identify a diagnostic solution based on an analysis of vehicle data.

34. A diagnostic kiosk configured for use with a diagnostic port on a vehicle for communicating with an onboard vehicle computer, the kiosk comprising:
a main unit housing;
an interactive interface coupled to the main unit housing and connectable with the vehicle, the interactive interface comprising:
a connector port configured to be plug connectable to the diagnostic port to facilitate communication of data signals with the vehicle;
a speaker operative to facilitate transmission of audio signals to a user; and
a cable connected to the main housing unit and configured to facilitate communication of both the data signals and the audio signals between the main housing unit and the vehicle, the audio signals including instructions associated with accessing and retrieving automotive diagnostic data prior to any communication with the diagnostic port.

* * * * *